(12) United States Patent
Maggenti (10) Patent No.: US 6,633,765 B1
(45) Date of Patent: Oct. 14, 2003

(54) METHOD AND APPARATUS FOR PERFORMING COVERAGE CONTROL FOR MULTICAST SERVICES IN A WIRELESS NETWORK

(75) Inventor: Mark Maggenti, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 359 days.

(21) Appl. No.: 09/649,267

(22) Filed: Aug. 28, 2000

(51) Int. Cl.[7] ............................................. H04B 15/00
(52) U.S. Cl. ...................... 455/503; 370/312; 370/390
(58) Field of Search ................................ 455/450, 452, 455/517, 503, 453, 411; 370/432, 312, 346, 390, 408, 347, 280, 238

(56) References Cited

U.S. PATENT DOCUMENTS

| | | | | |
|---|---|---|---|---|
| 5,038,399 A | * | 8/1991 | Bruckert | 455/447 |
| 6,128,472 A | * | 10/2000 | Harel et al. | 340/7.21 |
| 6,163,700 A | * | 12/2000 | Hussain et al. | 455/453 |
| 6,370,142 B1 | * | 4/2002 | Pitcher et al. | 370/390 |
| 6,477,149 B1 | * | 11/2002 | Okanoue | 370/312 |

FOREIGN PATENT DOCUMENTS

| | | |
|---|---|---|
| WO | 0013356 | 3/2000 |
| WO | 0219741 | 3/2002 |

OTHER PUBLICATIONS

XP010204037, Xylomenos G et al.: "IP Multicasting For Wireless Mobile Hosts", Military Communications Conference, 1996, Oct. 21, 1996, pp. 933–937.

XP002007299, Deering S: "Host Extensions For IP Multicasting", Internet Specification RFC, XX, XX, No. 1112, Aug. 1, 1989, pp. 1–17.

W. Fenner, Xerox PARC; Network Working Group; "Internet Group Management Protocol", Version 2; The Internet Society, Nov. 1997; RFC 2236; pp. 1–24.

S. Deering, Stanford University; Network Working Group; "Host Extensions for IP Multicasting";May 1998; RFC 1054; pp. 10–15.

* cited by examiner

Primary Examiner—William Trost
Assistant Examiner—Nghi H. Ly
(74) Attorney, Agent, or Firm—Philip R. Wadsworth; Gregory D. Ogrod; Thomas M. Thibault (57) ABSTRACT

A method and apparatus for providing coverage control for multicast service in a wireless network. The present invention comprises a central transceiver for receiving a membership report from a plurality of wireless communication devices, the membership report identifying a multicast group to which at least one wireless communication device belongs. The central transceiver transmits an indication of the multicast group identified in the membership report to at least a portion of the plurality of wireless communication devices. The wireless communication devices use the information contained within the indication to determine whether or not to transmit a membership report identifying a multicast group to which it currently belongs.

26 Claims, 8 Drawing Sheets

FIG. 8

METHOD AND APPARATUS FOR PERFORMING COVERAGE CONTROL FOR MULTICAST SERVICES IN A WIRELESS NETWORK

BACKGROUND OF THE INVENTION

I. Field of the Invention

The present invention relates generally to group messaging and more particularly to a method and apparatus for efficiently controlling group multicast messaging in a wireless network.

II. Description of the Related Art

Traditional network computing applications involve communication between two computers. In such networks, data is transmitted from one computer to another computer in a point-to-point manner. That is, data from one computer is sent to the other computer, and no other.

However, some important emerging applications, such as LAN TV, desktop conferencing, corporate broadcasts, and collaborative computing, require data transmission in a "point-to-multipoint" fashion, that is, transmitting data to multiple recipients simultaneously. Such applications would require a tremendous amount of network bandwidth to be effectively implemented using the point-to-point technique. For example, using a traditional point-to-point transmission scheme would require the same information to be transmitted n times, where n represents the number of recipients. The bandwidth required to accomplish such a task would grow in proportion to the number of computers receiving the transmission. Such an approach is infeasible for applications where large data transmissions, such as audio and video, need to be sent to a large number of recipients.

To effectively implement the transfer of large quantities of data in a point-to-multipoint network, a broadcast design has been proposed. In a broadcast design, data is broken into packets, each packet addressed to a "broadcast address", rather than addressing multiple copies of each packet to each recipient desiring the information. However, if this technique is used, the network must generally send the information packets throughout the entire network so that anyone desiring reception of the information can "listen" to the broadcast address and receive the information. Sending information packets everywhere is a significant use of network resources if only a small group of recipients desire the information.

To overcome this problem, a technique known as IP multicast has been developed for use in wired IP networks. With IP multicast, applications can send one copy of each data packet and address it to a group of recipients that wish to receive the information generated by an application. This technique addresses data packets to a group of recipients rather than to individual recipients, and it relies on the network to forward the data packets only to paths that have a sub-network that needs the information, i.e., a sub-network having at least one recipient desiring the particular IP multicast. An example of a subnetwork is a local broadcast network, such as an Ethernet LAN.

Applications for point-to-multipoint communications in wireless networks have not yet been widely implemented, due to the large bandwidth necessary to accommodate such communications. However, increases in wireless data rates, and hence bandwidth, indicate that such applications may eventually become used in such wireless networks.

In a wireless network, users of wireless communication devices communicate over an air-interface to a central computer. This may be done directly, as in the case of a wireless LAN in an office environment, or it may be done through cellular infrastructure equipment, as in the case of a wireless telephone application. In such wireless networks, it would be desirable to limit multicast transmissions to a specific geographic area having at least one user desiring reception. Since the broadcast sub-network for a wireless network usually corresponds to a particular geographic area, the process of determining which sub-networks require transmission determines which geographic areas are covered by the multicast transmission and, hence, the name "coverage control." Presently, in order to transmit a multicast transmission in a wireless network, the transmission must be sent to all end devices, regardless of whether or not the multicast transmission is desired.

SUMMARY OF THE INVENTION

The present invention is a method and apparatus for providing coverage control for multicast service in a wireless network. The present invention allows multicast transmissions to be efficiently distributed in a wireless network by limiting transmissions of multicast information to a subset of available devices in the wireless network.

In one embodiment, the present invention is an apparatus for providing coverage control for multicast service in a wireless network, the wireless network comprising a central transceiver and a plurality of wireless communication devices. The present invention comprises the central transceiver, comprising a receiver for receiving a membership report from a wireless communication device, the membership report identifying a multicast group, the membership report provided to a processor. The processor generates an indication of the multicast group identified in the membership report and provides the indication to a transmitter for transmitting the indication to at least a portion of the plurality. of wireless communication devices.

In another embodiment, the present invention is a method for providing coverage control for multicast service in a wireless network, the wireless network comprising a central transceiver and a plurality of wireless communication devices. The present invention comprises the steps of receiving a membership report from a first wireless communication device, the membership report identifying a multicast group. An indication of the received membership report is generated by a processor contained within the central transceiver. The indication is then transmitted to at least a portion of the plurality of wireless communication devices, the indication identifying the multicast group identified in the received membership report.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is a method and apparatus for providing coverage control for multicast service in a wireless network. Although the present invention is described within the context of a terrestrial-based wireless communication system, it should be understood that the present invention may also be used in other wireless communication systems as well, for example, in a satellite-based communication system. In addition, the present invention is not limited to a wireless telephone system, but may also be used in wireless data applications such as a local area network (LAN) or a wide area network (WAN).

The present invention allows wireless communication devices in a wireless network to determine which multicast groups other wireless communication devices in the network are receiving or would like to receive. This is accomplished by transmitting an indication of desired multicast(s) to other wireless communication devices when information is received by a central transceiver. This reduces the number of transmissions by other wireless communication devices who also wish to join a multicast group, thus preventing a processing burden on system resources. It also advantageously reduces the communications bandwidth used.

Figure 1:
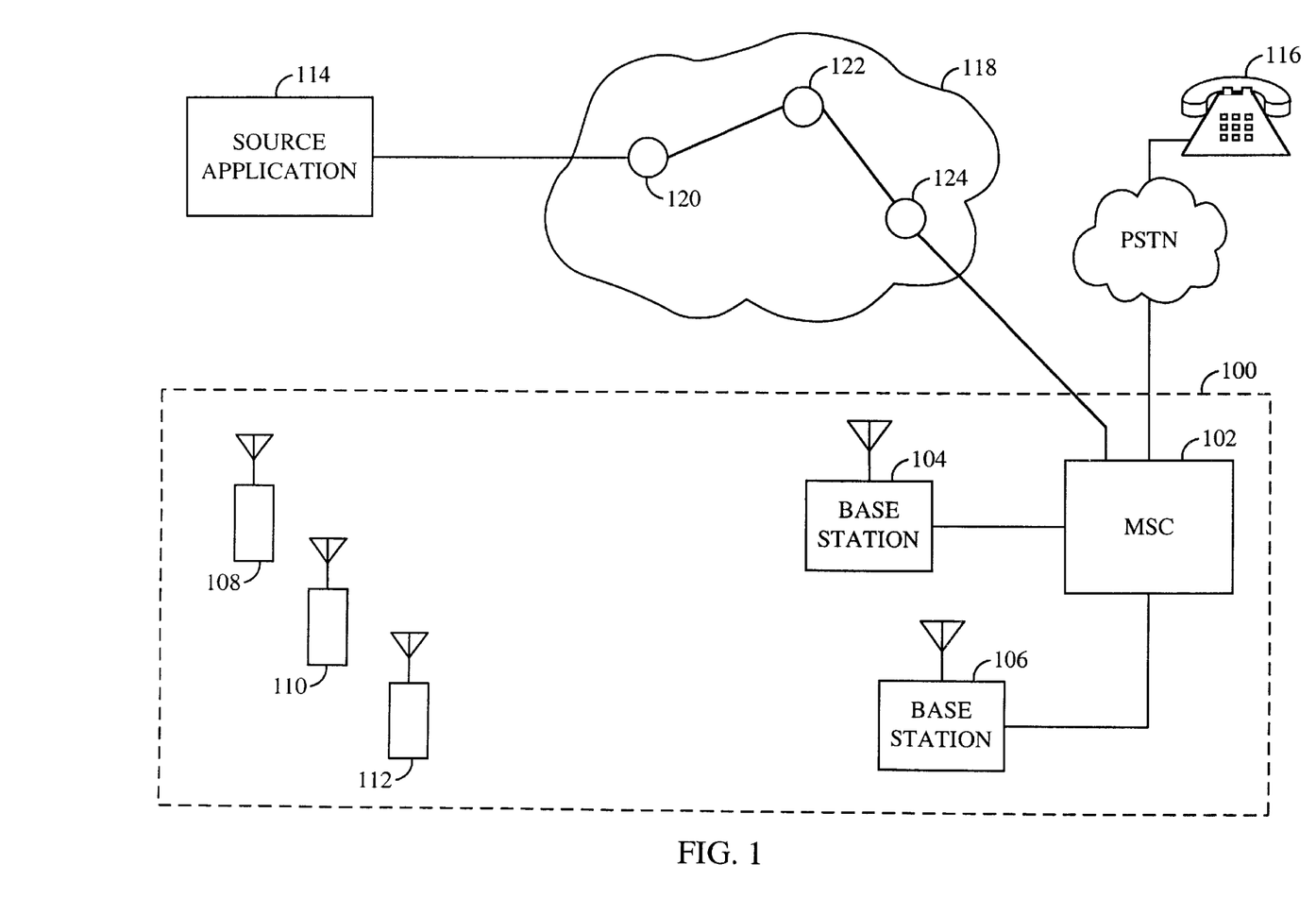
FIG. 1 is a block diagram of the present invention as used in a wireless communication system.

FIG. 1 is a block diagram of the present invention as used in a wireless communication system 100. Wireless communication system 100 may use one of a number of available modulation techniques, such as code division multiple access (CDMA) or time division multiple access, among others. Communication system 100 comprises mobile switching center (MSC) 102, one or more base stations 104 and 106, and three wireless communication devices (WCD) 108, 110, and 112. A large number of WCDs are typically operating within communication system 100, although only three of such devices are shown in FIG. 1 for clarity. WCD 108, 110, and 112 are wireless telephones in one embodiment of the present invention, however, they could alternatively comprise a wireless recording device, a wireless camera, a wireless video recorder, a computer, or a combination of these devices.

In communication system 100, WCDs 108, 110, and 112 communicate through an air-interface with one or more base stations 104 and/or 106, using one of the well-known modulation techniques mentioned above. Communication system 100 is generally capable of offering both voice and data services to users of the system. Voice services are standard, point-to-point audio communications, typically between a WCD and one other WCD or a wireline communication device, such as a standard telephone. Data services are generally any communications which are capable of transmission over a data network, such as the Internet. Data services allow the transmission of data files, such as email, database information, maps, executable programs, etc. In addition, audio, video, or any information may be encapsulated into data packets, otherwise known as datagrams, for transmission over-the-air and then across a network.

Transmissions to WCDs may originate at either source application 114 or telephone 116, depending on the nature of the transmission. For data transmissions, information from source application 114 is packaged into datagrams, then provided to data network 118, which, in one embodiment, comprises the Internet. Source application 114 can be any data generation source, such as a computer or computer program, a telephone, a video or still camera, or a website. Source application 114 generally may transmit and receive data, although in a multicast application, such as transmitting audio and/or video information, source application 114 generally only sources data in a multicast fashion to the data network.

The datagrams from application source 114 are routed though data network 118 by routers 120, 122, and 124. Network 118 typically comprises hundreds or even thousands of routers, however only three are shown in FIG. 1 for purposes of clarity. A router is a well-known device for distributing datagrams across data network 118 using information contained within each datagram specifying a destination for the datagram. In data network 118, each router is generally located a large distance, from other routers and each serves a local area of users.

In one embodiment, datagrams are routed from router 120 to router 122, then to router 124, and finally to MSC 102. The datagram is received by an Interworking Function (IWF, not shown), generally within MSC 102 or base station 104/106. The IWF is a well-known device for sending and receiving data transmissions between a wireless communication system and a land-based data network such as data network 118. In other embodiments, datagrams are routed from router 124 directly to base stations 104 and/or 106, or they may be routed through MSC 102 using a custom interface much like the IWF. In any case, datagrams are routed to base stations 104 and/or 106 using well-known techniques.

Datagrams are then transmitted to an intended WCD though at least one base station 104/106, as is well known in the art. For data transmissions from a WCD to source application 114, the process is reversed.

Voice services between a WCD and another WCD, or to telephone 116 is well known in the art and is therefore not discussed herein.

Figure 2:
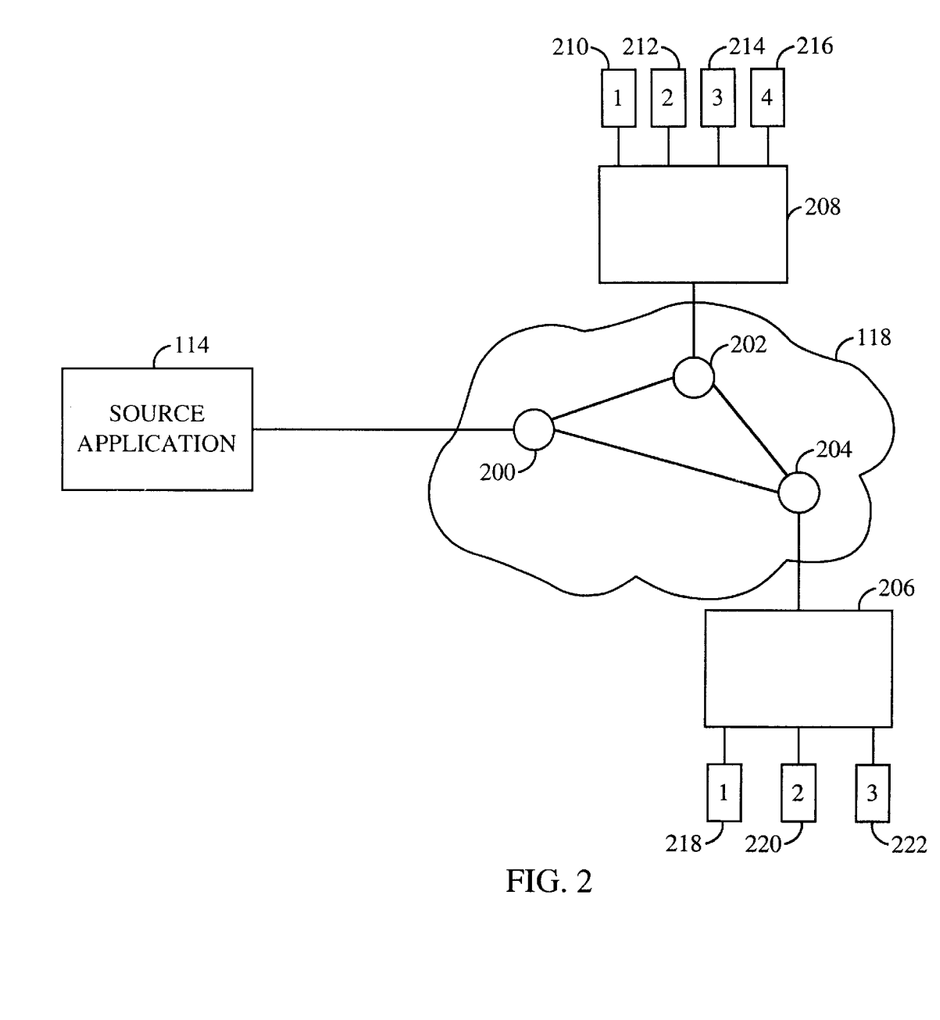
FIG. 2 illustrates the concept of IP multicast, as applied to a data network.

FIG. 2 illustrates the concept of IP multicast, as applied to data network 118. IP multicast is a method of efficiently distributing data from a single source, such as source application 114, to multiple recipients over data network 118. Unlike standard broadcast techniques, data can be sent once from data source 114 to a group of devices that are programmed to receive it. Using this technique, data packets are generated comprising a group destination address identifying a particular multicast group. For example, source application 114 could comprise a sports scores information website and any datagrams transmitted by source application 114 would comprise a destination address reserved for that particular multicast, in this example, a sports scores multicast. Routers 200, 202, and 204 forward datagrams from source application 114 to any router/device which has "registered" to receive the sports scores multicast. Registrations typically originate with an end device, such as a computer. The desire to receive the sports scores multicast is transmitted from the end device, through the various routers comprising data network 118, and finally to a router in direct communication with the source application, in this case, source application 114.

It is important to note that after one end device has requested membership in a particular multicast group, it is not necessary for other end devices in the same local subnet to request inclusion in the multicast, because data from source application 114 will already be forwarded to the local subnet as a result of the previous request.

In IP multicast, a protocol known as Internet Group Management Protocol (IGMP) is used to add and delete end devices from multicasts, as well as to communicate this information between routers.

In the case of communications between routers and their respective end devices, an IGMP End device Membership Query is periodically sent to all end devices using a predetermined destination address, such as an IP address of 224.0.0.1, and having a time-to-live (TTL) value of 1. The Membership Query is used to determine which multicasts are needed by at least one end device within the local router. Each end device, in response to the Membership Query, transmits a membership report to the local router, identifying the multicast groups that are desired. In order to avoid a flurry of membership reports from the end devices in response to the Membership Query, each end device starts a randomly chosen report delay timer for each of its multicast group memberships. If, during the delay period, a report identifying a first multicast group is transmitted from another end device within the group of local end devices, each end device resets its associated timer, thereby preventing the other end devices from generating a membership report with respect to the first multicast group. As the membership report is sent to the local router, all other local end devices in the local network also "hear" the membership report. This procedure guarantees that membership reports are spread out over a period of time and that report traffic is minimized for each group of local end devices.

When no membership reports identifying a given multicast group after a predetermined number of queries, the router assumes that no end devices desire the information from the given multicast group, and therefore, the router no longer forwards datagrams for that multicast to the local end devices.

It should be understood that any end device can join a multicast group by simply generating a request and sending it over the local network to the local router. It does not have to wait for a membership query from the local router to join a multicast group.

The previous discussion can now be illustrated by referring FIG. 2. Assume that source application 114 generates a multicast relating to a sporting event, comprising both audio and visual information. Users of individual end devices, typically home or business computers, may want to receive the multicast transmission from source application 114. Such individual end devices are shown in FIG. 2 as end devices 218, 220, 222, 210, 212, 214, and 216. End devices 218, 220, and 222 comprise a local net, each end device networked with each other and a local router 206. Similarly, end devices 210, 212, 214, and 216 comprise a local net, each end device networked with each other and a local router 208. Local router 206 or 208 may also be known as an Ethernet or token-ring hub.

Local router 206 is connected to router 204, and local router 208 is connected to router 202. Routers 204 and 202, in turn, are connected to each other as well as router 200. Router 200 is connected to source application 114. Routers 200, 202, and 204 are generally connected to other routers, internet gateways, local routers, and source applications.

Focusing on local router 206, at a predetermined time interval, local router 206 will send an IGMP membership query to all local end devices, in the current example, to end devices 218, 220, and 222. When an end device receives a membership query, it responds with a membership report for each multicast group to which it belongs. For example, end device 218 and end device 220 may already belong to a multicast group relating to sports scores.

However, end devices 218 and 220 do not respond to the membership query immediately. Instead, each end device starts an independent, randomly chosen report delay timer for the sports scores multicast group. For example, end device 218 chooses a timeout value of 1 second and end device 220 chooses a timeout of 1.5 seconds. When the first timer times out in end device 218 after 1 second, it responds to the membership query by alerting local router 206 that it belongs to the sports scores multicast group. End devices 220 and 222 also hear this report. End device 220, hearing that end device 218 has already reported its membership in the sports scores multicast group, resets its timer to zero and does not respond to the membership query, even though it is also a member of the sports scores multicast group. End device 222 also does not respond to the membership query, because it does not belong to any multicast group. This has the effect of reducing the number of responses to membership queries that need to be sent.

The response from end device 218 is provided to router 200, generally through a series of routers in addition to router 204. As each router receives the response that end device 218 is a member of the sports scores multicast, the routers know to forward any sports scores multicast information to the next router down the chain. For example, router 200, upon receiving multicast traffic relating to the sports scores group from source application 114, knows that at least router 204 desires reception of the sports scores multicast. Therefore, the information from source application 114 is forwarded to router 204. No membership requests or status have been received from router 202, therefore, the sports scores multicast information is not forwarded to that router. Router 204, having received information from local router 206 that at least one end device in its local network requires the sports scores multicast, forwards the information to local router 206. Local router 206 then forwards the multicast information to the local network, where all end devices receive the information, but only those end devices who desire the information will process it.

It should be noted that multicast routers do not need to be directly addressed since their interfaces are configured to receive all multicast IP traffic. Also, a router does not need to maintain a detailed list of which end devices belong to each multicast group; the router only needs to know that at least one group member is present on a network interface. Multicast routers periodically transmit membership queries to update their knowledge of the group members present on each network interface.

If the router does not receive a report for a particular multicast group after a number of queries, the router assumes that group members are no longer present on the interface and the group is removed from the list of group memberships for the directly attached local network.

Figure 3:
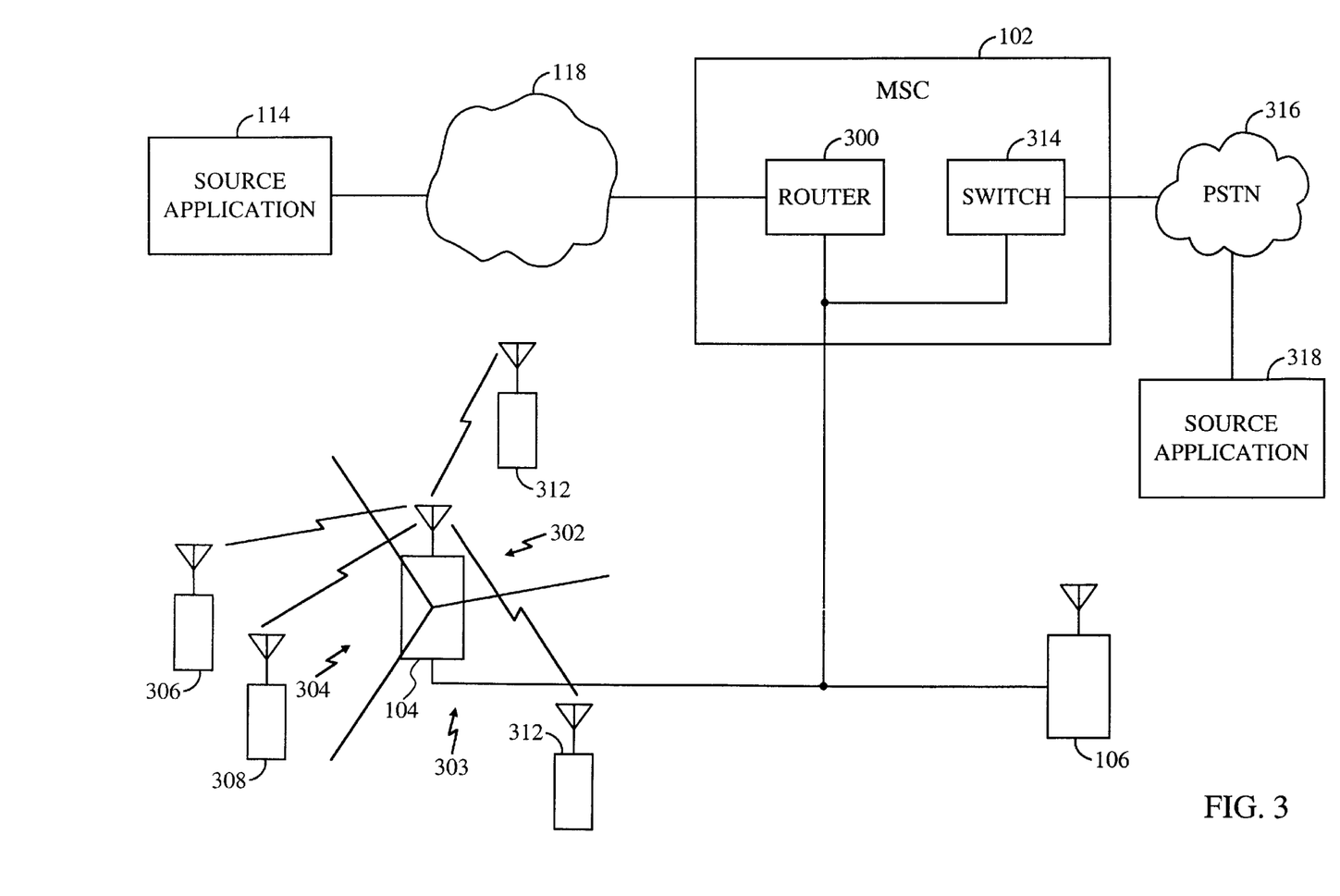
FIG. 3 illustrates the present invention as implemented in a wireless network, such as a wireless telephone communication system.

FIG. 3 illustrates the present invention as implemented in a wireless network, such as a wireless telephone communication system. As explained previously, multicast information is sourced from source application 114, in this example, information relating to sports scores. The multicast information is provided to data network 118, in one embodiment, comprising the Internet.

WCDs throughout the wireless communication system send and receive wireless information through one or more base stations 104 and/or 106. In a wireless LAN or WAN environment, base station 104 is equivalent to a wireless hub or central transceiver with respect to the present invention. Throughout this disclosure, it should be understood that references to base station 104 and 106 are equally applicable to a central transceiver.

Frequently, the base stations provide coverage to WCDs by breaking down a geographic coverage area into multiple coverage areas known as geographic regions. Each geographic region uses a different frequency, time slot arrangement, set of codes, or code timing offsets to communicate with WCDs in the respective coverage areas, depending on the type of modulation used in the wireless communication system. Base station 104 is shown in FIG. 3 as dividing its coverage area into three geographic regions, geographic region 302, geographic region 303, and geographic region 304. Geographic region 302 is shown having WCD 310 within its coverage area, geographic region 303 having WCD 312 in its coverage area, and geographic region 304 having WCD 306 and WCD 308 within its coverage area.

In the wireless communication system of FIG. 3, wireless group services may be offered. Wireless group services involve the transmission of information to multiple users simultaneously. It may also allow each WCD to send information to all or a subset of all WCDs in the system.

At least two types of group communication services are possible. One type makes use of a dedicated forward link, i.e. an air-interface from a base station to a WCD, to be used as a broadcast channel. Information is transmitted on one or more broadcast channels and is received by any WCD desiring the information. This allows an efficient method of transmitting group data because only a single channel is used to communicate information to many WCDs.

A second method of providing group services is to establish a forward link with each WCD independently. This method consumes more system resources than the first method, however it is more easily implemented in existing wireless communication systems. Those WCDs desiring group information establishes a forward link to a base station. Group information is then provided by the base station to each WCD that has established a forward link and desires the information.

In the reverse link, i.e. the air-interface from a WCD to a base station, similar transmission schemes are available. A dedicated broadcast channel may be used by all WCDs within a predefined geographic area to relay information to a base station, or each WCD may establish its own reverse link. The forward and reverse link scenarios may be mixed and matched. That is, in one embodiment, a dedicated broadcast channel may be used in the forward link while in the reverse link, each WCD establishes its own reverse link.

In the wireless communication system of FIG. 3, WCDs are capable of communicating with base stations 104/106 using voice services or data services. Voice services are commonly used in wireless communication systems to allow audio information, typically human speech, to be transmitted over the air. Typically, a frequency, time slot, or spreading code is assigned to each call by base station 104 during initiation of a voice service call. A dedicated airresource, or channel, is established between a WCD and a base station. The channel is maintained for the duration of the call. When the call terminates, the channel is de-allocated, or "torn down", so that it may be used for another call.

Data services enable WCDs to communicate by transmitting information using data packets, such as Internet Protocol (IP) packets. Generally, a channel is established between a WCD and a base station only long enough to transmit data packets. After the channel becomes idle, for example no data being transmitted over the channel for a predetermined amount of time, the channel is torn down so that other data calls may be placed. During a data communication, WCDs are typically assigned an IP address, just as any end device on data network 118 would be assigned. Frequently, the IP addresses assigned in the wireless communication network are temporary addresses which are established upon a WCD initiating a data connection with one or more base stations.

To receive multicast information pertaining to a particular multicast group, such as sports scores, a user of WCD 306, for example, will initiate a communication with base station 104 in geographic region 304, using either the voice service or the data service. A channel is established between WCD and, for example, base station 104. If a data call was initiated, an IP address is generally assigned to WCD 306 by router 300, or alternatively, other methods well-known in the art. The user then sends a transmission to base station 104 indicating his desire to receive the sports scores multicast. The request to join a particular multicast group may be transmitted on a shared access channel, a dedicated traffic channel, a control channel, an SMS channel, or any other means for transmitting the request from WCD 306 to base station 104. These channels are received by base station 104 but not in general by other WCDs, in contrast to most wired data networks.

The request is received by base station 104 and forwarded to MSC 102. If the request was received as a result of a voice service call, the request may be forwarded to MSC 102 and provided to switch 314. Switch 314 then forwards the request to PSTN 316 in accordance with information contained within the request, such as a telephone number associated with source application 318. Source application 318 is generally an audio or video broadcast intended for many end devices simultaneously.

If the request was received by base station 104 as a result of a data service call, the request may be forwarded to Interworking Function (router) 300 at MSC 102. Alternatively, router 300 may not be physically co-located with MSC 102. Router 300, in general, comprises any device able to interface data network 118 to base station 104. Frequently, router 300 is co-located within MSC 102, however this need not be the case. Routers are devices well known in the art and therefore will not be described here in detail.

The request from WCD 306 is received by router 300 and forwarded to data network 118, through one or more routers within data network 118, finally to router or gateway connected to source application 114.

When multicast information is sent by source application 114, it is routed through data network 118, then to router 300. Router 300 knows that a WCD in the coverage area of base station 104, geographic region 304, desires the multicast. The multicast information is then provided to base station 104, where it is forwarded to at least WCD 306. In another embodiment, the multicast information is provided to all WCDs within the coverage area of geographic region 304 using a broadcast channel dedicated to transmitting the sports scores multicast. In another embodiment, the multicast information is provided on a general broadcast channel, dedicated to all multicast transmissions, regardless of which multicast is being transmitted.

If more than one WCD in a particular geographic region wishes to receive the same multicast that another WCD has already requested, that WCD does not have to send a request to base station 104 to receive the multicast. As explained previously, when a first WCD requests addition to a multicast group, the request, or an indication thereof, is provided to all, or a subset of all, WCDs, generally by base station 104. It is desirable for base station 104 to alert WCDs to a membership request due to mutual visibility constraints. In other words, base station 104 has the ability to contact all WCDs within its coverage area, but any one WCD does not necessarily have the ability to control other WCDs directly, due to geographical and power constraints. Any WCD who subsequently desires to participate in that particular multicast does not have to request addition to the multicast, if it knows that a request from at least one other WCD within at least the geographic region has already requested the multicast.

In another embodiment, when a first WCD requests addition to a particular multicast group, the request, or an indication thereof, is forwarded to all, or a subset of all, WCDs within the coverage area of the base station receiving the request. For example, if WCD 306 sends a request to base station 104 to receive the sports scores multicast, base station 104 will forward the request to router 300 and will also provide an indication of the request to all, or a subset of all, WCDs within the coverage area of base station 104, regardless of which geographic region the WCDs are operating. Therefore, if another WCD operating within the coverage area of base station 104 wishes to join the same multicast group, in this example sports scores, there is no need to transmit a request to join the multicast as the previous request is provided to all, or a subset of all, WCDs within the coverage area of base station 104. This reduces the number of requests to be processed and transmitted by WCDs.

In addition to forwarding a request to join a multicast group from a WCD to data network 118 or PSTN 316, the present invention also provides an indication to other WCDs that the request was initiated. Thus, when a subsequent WCD wishes to join the same multicast group, a request does not need to be transmitted by the subsequent WCD. The subsequent WCD is aware that the multicast is already being provided as a result of receiving the indication that a prior WCD has already requested the particular multicast.

The indication that a WCD has requested participation in a multicast group may be transmitted to other WCDs in one of a variety of ways. In one embodiment, when the request to join a particular multicast group is received by base station 104, an indication of the request is sent to router 300 and also provided to all other WCDs operating within geographic region 304. This may be accomplished by sending a page message to all WCDs in geographic region 304, or it may be accomplished by any other wireless transmission method, including sending an SMS message, or by sending the request via a dedicated or common channel, traffic channel, or control channel. In another embodiment, the request is provided selectively to only certain WCDs in geographic region 304, such as those WCDs which are capable of communications using data services, or to those WCDs enabled for receiving multicast, group, or broadcast communications.

In another embodiment, the indication is provided to all WCDs operating within the coverage area of base station 104, regardless of which geographic region each WCD is operating. In another embodiment, the request is provided to only a select subset of WCDs operating within the coverage area of base station 104.

The indication may be generated by one of any number of methods known in the art. In one embodiment, a request to join a particular multicast group is received by base station 104. Base station 104 forwards the request to MSC 102, and also forwards the same request to other WCDs as described above. In this embodiment, the request is received and re-transmitted to other WCDs using one of the methods described above. In another embodiment, the indication is generated by base station 104 by creating a message using the information contained within the request, such as an identification of the multicast group to which membership is sought. The indication is then created, comprising the identified multicast group. Other information may be included in the indication, such as the time the request, or the indication, was generated, an identification of the WCD sending the request, and/or a location of the requesting WCD (such as GPS information, geographic region or base station that the requesting WCD is operating). In another embodiment, the indication is generated at MSC 102.

From time to time, it is desirous for base station 104 to query the WCDs in its coverage area to determine if multicast services are still needed. In one embodiment, base station 104 sends a membership query to all WCDs within one or more geographic regions. The membership query may be transmitted using a well-known flood paging technique, or it may be transmitted using any other technique for sending messages over an air interface.

The membership query essentially polls each WCD to determine which multicast groups each WCD is currently interested in receiving. Each WCD responds to the membership query with a membership report indicating the multicast group(s) to which it currently belongs. However, WCDs do not send a membership report immediately upon receipt of the membership query. The membership report for each WCD is transmitted at different times so that other WCDs can listen to the report and use the information to decide whether to report or not.

In one embodiment, each WCD contains a random timer associated with each multicast group to which it belongs. When the membership query is received, each of these timers is started. When the first timer out of all the WCDs times out, a membership report is transmitted by the associated WCD. The membership report is a message that indicates which multicast groups the reporting WCD belongs to. The membership report is transmitted by the reporting WCD to base station 104, which forwards the message to MSC 102 as well as to other WCDs operating in at least the same geographic region that the reporting WCD is operating. In another embodiment, an indication of the membership report is transmitted to the WCDs operating in the reporting WCD's geographic region. The indicator comprises a list of the multicast groups that the reporting WCD is a member. In yet another embodiment, the membership report, or an indication thereof, is transmitted from base station 104 to all WCD's operating within the coverage area of base station 104.

When a membership report or indicator thereof is received by a WCD operating in, for example, the same geographic region as the reporting WCD, the membership report, or indicator thereof, is interrogated to determine the multicast groups that were previously reported. If any of the reported groups match a multicast group that the current WCD is a member of, or wishes to become a member of, the random timer associated with that multicast group is reset. In other words, the current WCD will not send a membership report if it knows that another WCD in the same geographic region has already reported its membership in the common multicast group. If the current WCD is a member of a multicast group not reported in the membership report or indicator thereof, the random timer associated with the unreported group will continue to count down towards a time out. If no membership reports are received by the current WCD with respect to the interested multicast group, the current WCD will send a membership report upon the associated random timer timing out.

In another embodiment, a single random timer in each WCD is started upon receipt of a membership query. When the first WCD times out, it sends a membership report to base station 104 indicating all multicast groups to which it currently belongs. In an alternative embodiment, the membership report also includes any additional multicast groups that the WCD would like to join. The base station forwards the membership report to MSC 102 as well as to other WCDs operating within at least the same geographic region that the reporting WCD is operating, as before.

In yet another embodiment, a first membership report is sent to base station 104 using any of the just-described methods by a first WCD. However, base station 104 does not immediately send the first membership report to other WCDs (although it may immediately send the first membership report to MSC 102). In this embodiment, base station 104 waits until at least one other membership report (a second membership report) is received from a second WCD operating in the same geographic region as the first WCD. In another embodiment, base station 104 waits until at least a second membership report is received from a WCD operating in the same base station coverage area as the first WCD.

In either case, base station 104 creates a list of active multicast groups within a geographic region or coverage area, as the case may be. When the first membership report is received, the identified multicast groups are added to the list. When the second membership report is received, the identified multicast groups are also added to the list. If a multicast group identified in the second membership report is already in the list, a redundant entry is not entered. After the second membership report is received and the identified multicast groups are stored in the list, a message is transmitted from base station 104 to the WCDs operating within the geographic region (or base station coverage area) corresponding to the two membership reports. The message indicates the sum of the multicast groups to which the first and second WCDs belong. The message is received by the WCDs and interrogated to determine if the transmission of a membership report is necessary. This is determined in the same way as described previously.

Of course, base station 104 can collect more than two membership reports prior to sending the message. As each membership message is received, the identified multicast groups are added to the list. When a predetermined number of membership reports are received and processed, the message is transmitted to the geographic region (or base station coverage area) corresponding to the received membership reports.

Periodically, base station 104 (as well as other base stations in control of MSC 102) informs MSC 102 of the multicast groups which are needed by at least one WCD operating in a respective base station coverage area. This may be accomplished in one of several embodiments.

In a first embodiment, base station 104 periodically compares the active multicast groups as reported by WCDs during membership reports to a list of multicast groups that have previously been reported to base station 104 by the WCDs, referred to herein as the former list. Multicast information associated with each multicast group in the former list are forwarded by base station 104 to the necessary WCD(s), geographic region, or base station coverage area, as needed. Base station 104 periodically compares the active multicast groups as reported by one or more membership reports to the former list. If any multicast group listed in the former list is not identified in the one or more membership reports, then the multicast information associated with that group is no longer needed by WCDs operating within the coverage area of base station 104. Therefore, base station 104 sends a message to MSC 102 to remove the identified multicast group from a list of multicast groups stored in either router 300 or switch 314. The list of multicast groups stored at router 300 or switch 314 is a list of multicast groups needed by one or more base stations within the control of MSC 102. If no base station operating within the control of MSC 102 requires the identified multicast group, a message may be sent to either data network 118 or PSTN 316 indicating that the information associated with the identified multicast is no longer needed.

In a second embodiment, MSC 102 sends a message to each base station requesting the identification of any multicasts that are desired by WCDs operating within the respective coverage area of each base station. New or existing multicasts which are desired by at least one WCD operating within the coverage area of each base station are identified in one of the methods described above, then identified in a message to MSC 102. Any multicasts not identified in the message to MSC 102 are assumed to be inactive within the coverage area of the base station. A multicast which was previously forwarded to a base station is halted by MSC 102 if the return message from a base station does not identify that multicast as being a desired multicast.

Figure 4:
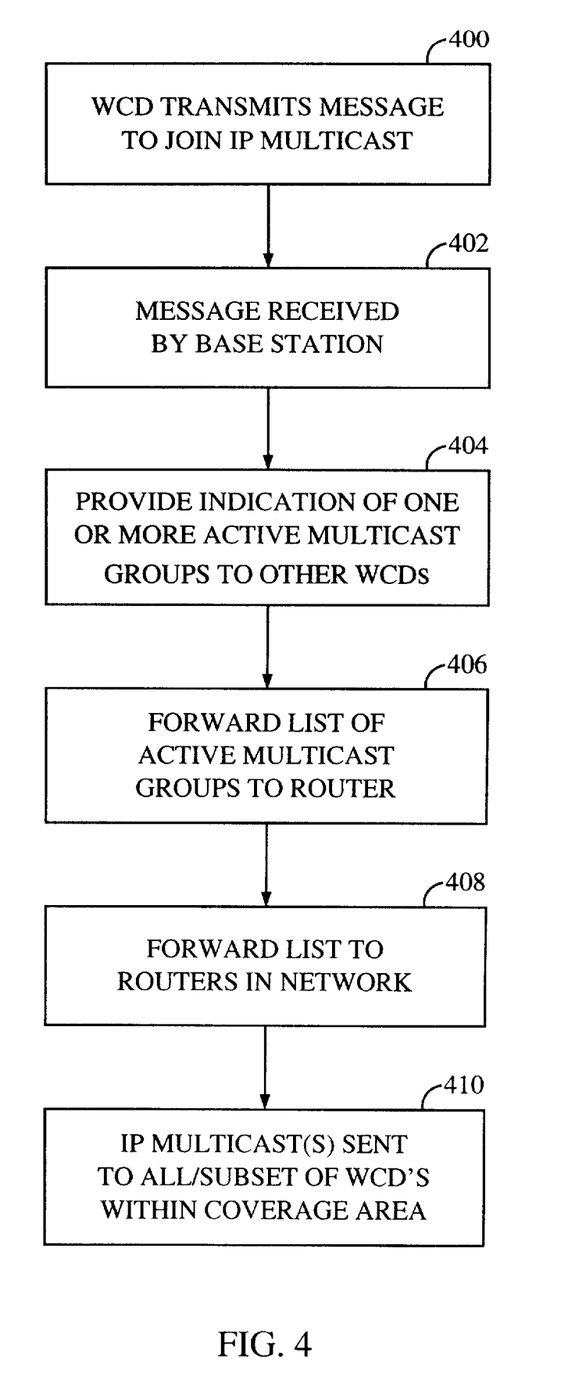
FIG. 4 is a flow diagram illustrating a method of a first wireless communication device joining an IP multicast group as used in the wireless communication system of FIG. 3.

FIG. 4 is a flow diagram illustrating a method of a first WCD joining an IP multicast group as used in wireless communication system 100. In step 400, a first WCD transmits a request to join a first IP multicast to which it does not presently belong. The first WCD may already be a member of one or more other IP multicasts at the time the new request is generated. The request generally comprises an identification of the requesting WCD and an identification of the first IP multicast.

In step 402, the request is received by a base station in communication with the first WCD. In step 404, an indication of the first IP multicast is transmitted to all, or a subset of all, WCDs operating within either a geographic region or an entire coverage area of the base station which received the request. The indication comprises an identification of at least one IP multicast that the first WCD desires, or is currently receiving. In another embodiment, two or more multicast groups are identified in the indication, the two or more groups derived from either a single request, or from two or more requests from different WCDs.

In step 406, the base station forwards a list of active multicast groups to MSC 102. The list comprises one or more IP multicast groups that are desired by at least one WCD within the coverage area of the base station. In step 408, the list is received by MSC 102, either by router 300, or switch 314, depending on whether the requesting IP multicast(s) is(are) a voice or a data application. The list of IP multicast groups are then forwarded to individual routers in network 118. In step 410, one or more desired IP multicasts are routed through network 118, through MSC 102, to the base station which provided the list of IP multicast group information, then to either all or a subset of all WCDs operating within a geographic region, or an entire coverage area, of the base station.

Figure 5:
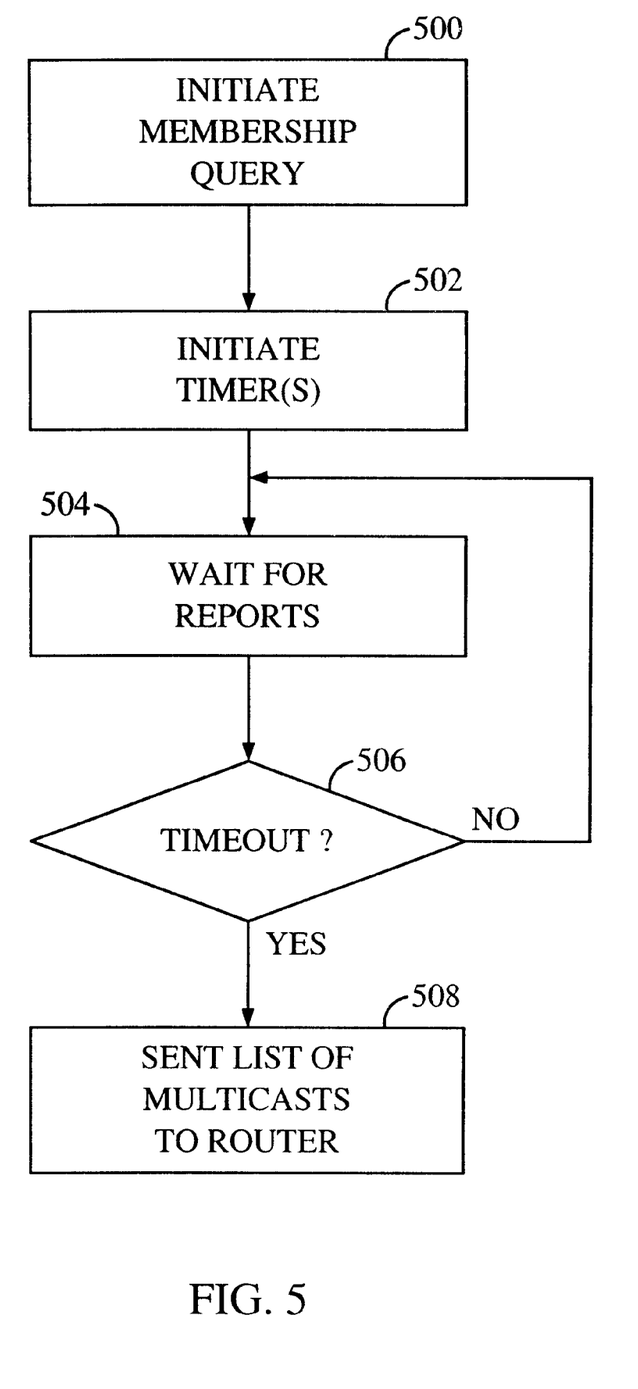
FIG. 5 illustrates a flow diagram of a central transceiver initiating a membership query to determine which IP multicasts are needed in the coverage are of the base station.

FIG. 5 illustrates a flow diagram of a base station initiating a membership query to determine which IP multicasts are needed in the base station coverage area. In step 500, a base station initiates a membership query by transmitting the query to all, or a subset of all, WCDs within one or more geographic regions or an entire coverage area. The membership query invites WCDs to report which IP multicast groups the WCDs are, or would like to, receive. In one embodiment, a base station countdown timer is started within the base station as shown in step 502. The base station countdown timer represents the maximum time that the base station will wait to receive responses from the various WCDs in its coverage area before initiating further action regarding membership in the various multicasts.

In one embodiment, each WCD that receives the membership query begins a random countdown timer for each multicast group to which it presently belongs. When the first timer within any WCD times out, a membership report is transmitted by the associated WCD. The membership report is a message that indicates which multicast group the reporting WCD belongs to. The membership report is transmitted by the reporting WCD to the base station.

In step 504, the base station waits for membership reports to be received from the various WCDs operating within the coverage area of the base station. As each membership report is received, the information associated with each report is stored in a memory device within the base station. For example, at a minimum, an identification of the reported multicast group is stored. In addition, in one embodiment, as each membership report is received, a message is transmitted to other WCDs operating within the coverage area of the base station to alert the other WCDs of the just-reported multicast group. The message may also be transmitted to MSC 102 at this time.

In step 506, the base station determines whether or not the base station countdown timer has expired. If not, the base station continues to wait for membership reports to be received, as shown in step 504. If the base station countdown timer has expired, the time for WCDs to respond to the last membership query has expired, and processing continues to step 508.

In one embodiment, in step 508, the base station generates a message indicating which multicast group(s) are desired for at least one WCD operating within the coverage area, or geographic region, of the base station. This step is an alternative to the embodiment wherein a message is generated each time a membership report is received, as described in step 504. The message is transmitted to MSC 102 and then to router 300 so that multicast information can be directed to the base station and WCDs which desire the multicast information.

Figure 6:
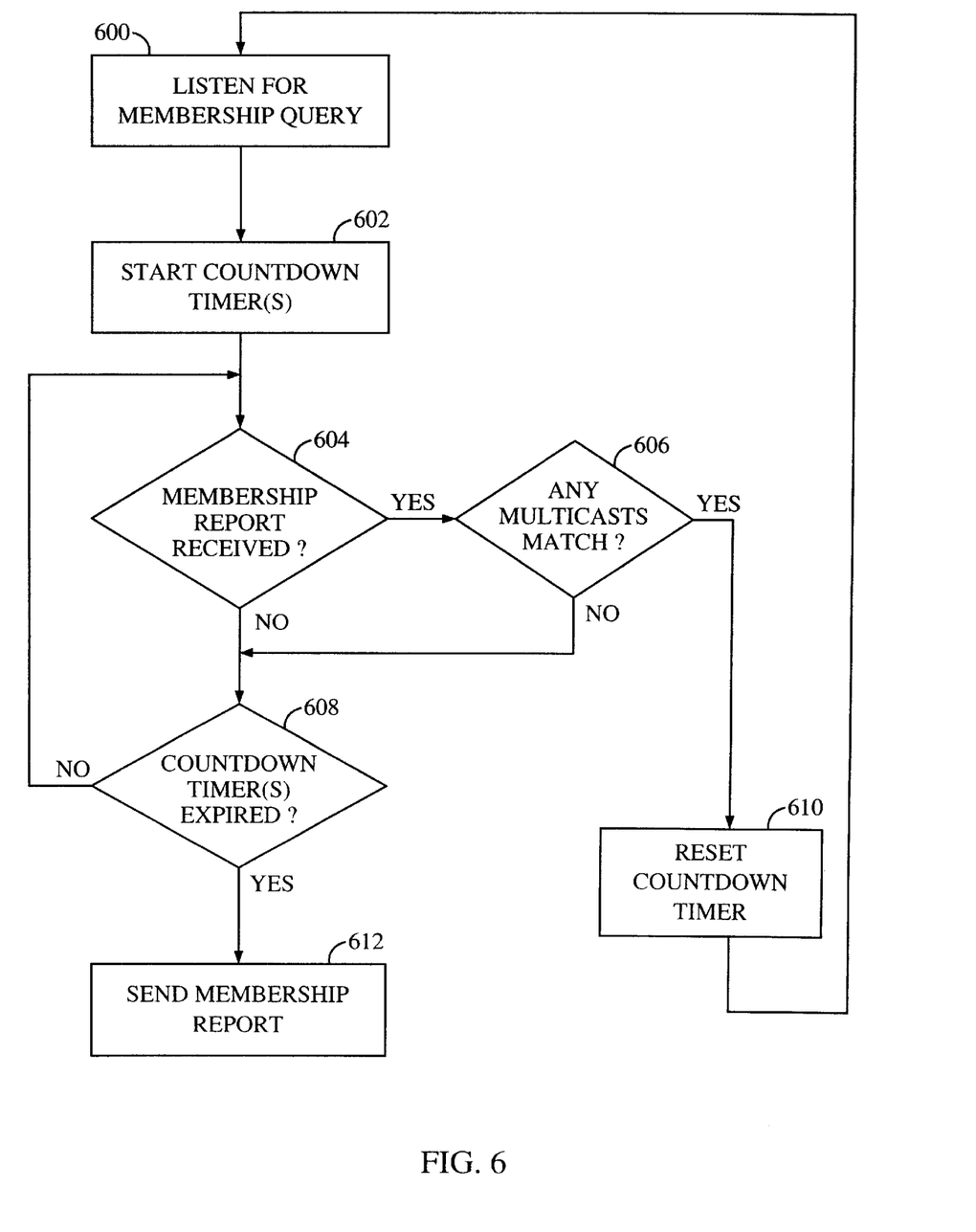
FIG. 6 is a flow diagram illustrating the method of the present invention as implemented in the wireless communication device of FIG. 4.

FIG. 6 is a flow diagram illustrating the method of the present invention as implemented in a WCD. In step 600, a WCD monitors a communication channel to determine if a membership query has been issued by a base station. The communication channel is generally a paging channel that is available to all WCDs operating within an entire base station coverage area, or a geographic region of a base station coverage area. The WCD remains listening to the communication channel until a membership query is received.

After a membership query is received, processing continues to step 602 where one or more random countdown timers are started, each timer associated with a single multicast group to which the WCD currently belongs. Each timer is set to a random value so that it is highly unlikely that any two timers within the WCD will be set to the same value. The countdown timer(s) allow a staggered response to membership queries. In another embodiment, only a single countdown timer is used within a WCD, no matter how many multicast groups the particular WCD belongs.

In step 604, WCD determines whether or not any membership reports have been received. A membership report is transmitted by the base station, alerting WCDs of a previous multicast registration by another WCD. If a membership report was received, processing continues to step 606.

In step 606, the membership report is interrogated to determine if it identifies any multicast groups to which the present WCD belongs. If there are no multicast groups identified in the membership report, processing continues to step 608. If there is one or more multicast groups identified in the membership report, processing continues to step 610.

In step 610, the random timer associated with the matching multicast group(s) is(are) reset, so that a membership report is not generated for the affected multicast group(s). Processing then continues to back to step 600, where the WCD waits for further membership queries.

If no multicast groups match the current WCD's list of multicast groups to which it currently belongs, as shown in step 606, or if a membership report is not received in step 604, processing continues to step 608.

In step 608, the WCD determines if any of its countdown timers has expired. If any countdown timer has expired, a membership report is transmitted to the base station in step 612. The membership report identifies the multicast group to which the current WCD belongs. The membership report is received by the base station, where it is used to alert other WCDs not to report membership in the reported multicast group, as such reports are redundant. If no countdown timer has expired in step 608, processing continues back to step 604.

Figure 7:
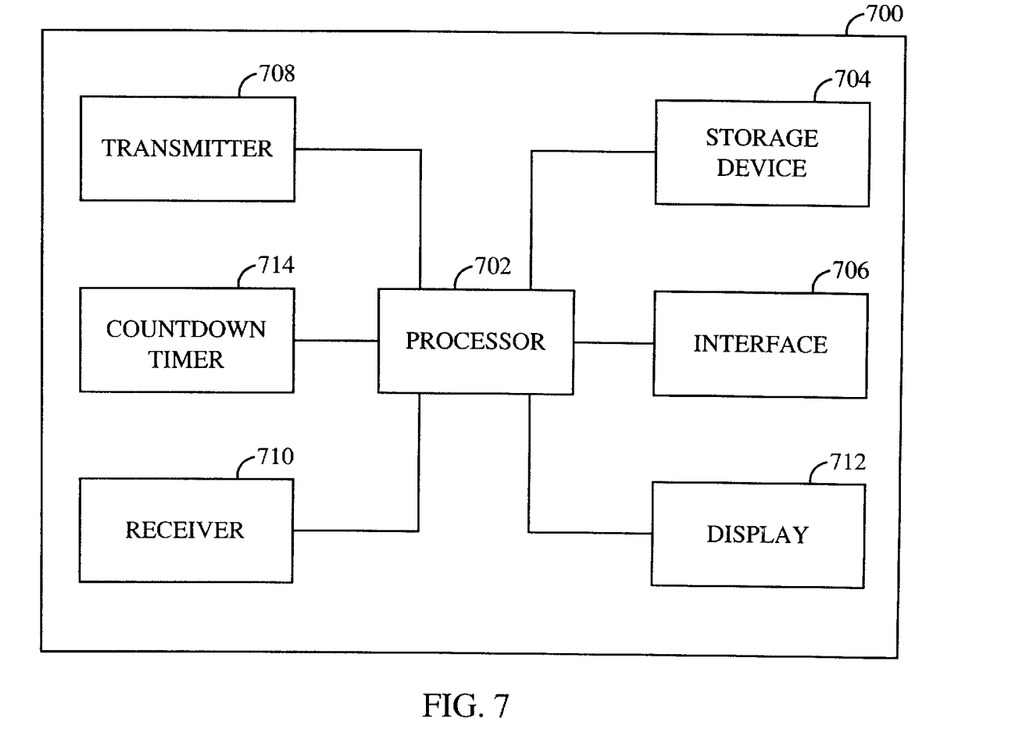
FIG. 7 illustrates the apparatus of the present invention as implemented in the wireless communication device of FIG. 4.

FIG. 7 illustrates the apparatus of the present invention as implemented in a WCD, shown in functional block diagram format. Shown is WCD 700, comprising processor 702, storage device 704, interface 706, transmitter 708, receiver 710, display 712, and optional countdown timer 714. WCD 700 receives wireless transmissions from central transceiver 104 and/or 106, including membership queries, indications of membership status, voice, and data information, as explained previously. Transmitter 708 transmits wireless information from WCD 700 such as membership status, voice, and data information, as needed. Transmitter 708 and receiver 710 are well known devices to those skilled in the art, and are not intended to be limited to any particular modulation technique or Industry Standard.

Receiver 710 monitors one or more predefined communication channels to receive information from the central transceiver. Occasionally, the central transceiver transmits a membership query to determine which multicast groups are needed among the WCDs in communication system 100. When WCD 700 receives a membership query from the central transceiver, it is provided to processor 702. Processor 702, in response, activates one or more optional countdown timers 714, each timer 714 associated with a single multicast group to which WCD 700 currently belongs, i.e., desires reception of a multicast transmission. Alternatively, processor 702 executes a set of preprogrammed instructions for implementing the one ore more optional countdown timers. In either case, the time associated with each countdown timer is a randomly assigned value, to avoid multiple simultaneous responses from the multiple WCDs in communication system 100. In an alternative embodiment, only one countdown timer is activated, no matter how many multicast groups WCD 700 belongs.

Membership in multicast groups is initiated by WCD 700 by transmitting a request to the central transceiver. The request contains information identifying the desired multicast group(s). A user of WCD 700 may select multicast groups using interface 706 (typically a keypad or voice-recognition system) and display 712. A list of available multicast groups are provided from time to time by the central transceiver, each multicast group identified generally by a unique identifier, such as an IP address. Multicast groups are generally identified by their IP address, although other identification schemes are possible.

Receiver 710 also monitors the one or more communication channels for an indication of a membership report from the central transceiver. The central transceiver transmits an indication of a membership report at predetermined intervals, such as when a membership report is received from a single WCD. In another embodiment, an indication of a membership report is transmitted after receipt of multiple membership reports, or at predefined time intervals. In any case, receiver 710 receives the indication of a membership report and provides the indication to processor 702. Processor 702 determines which multicast group or groups are identified in the indication, and compares them to a list of multicast groups that WCD 700 is currently a member, as stored in storage device 704. If a match is found with at least one multicast group, the countdown timer associated with the matching multicast group is reset, or otherwise cancelled, meaning that a membership report identifying the matching multicast group will not be transmitted. In an embodiment where a single membership report is transmitted comprising multiple multicast groups, an identification of the matching multicast group is not included in the membership report.

When a countdown timer expires, processor 702 generates a membership report and transmits this information to the central transceiver. The membership report identifies which multicast group WCD 702 is currently a member of. One membership report may be generated for each multicast group to which WCD 700 currently belongs, or a single membership report, containing identification information of multiple multicast groups to which WCD 700 currently belongs. Membership information is stored in storage device 704 when WCD 700 registers to become a member of a multicast group.

Figure 8:
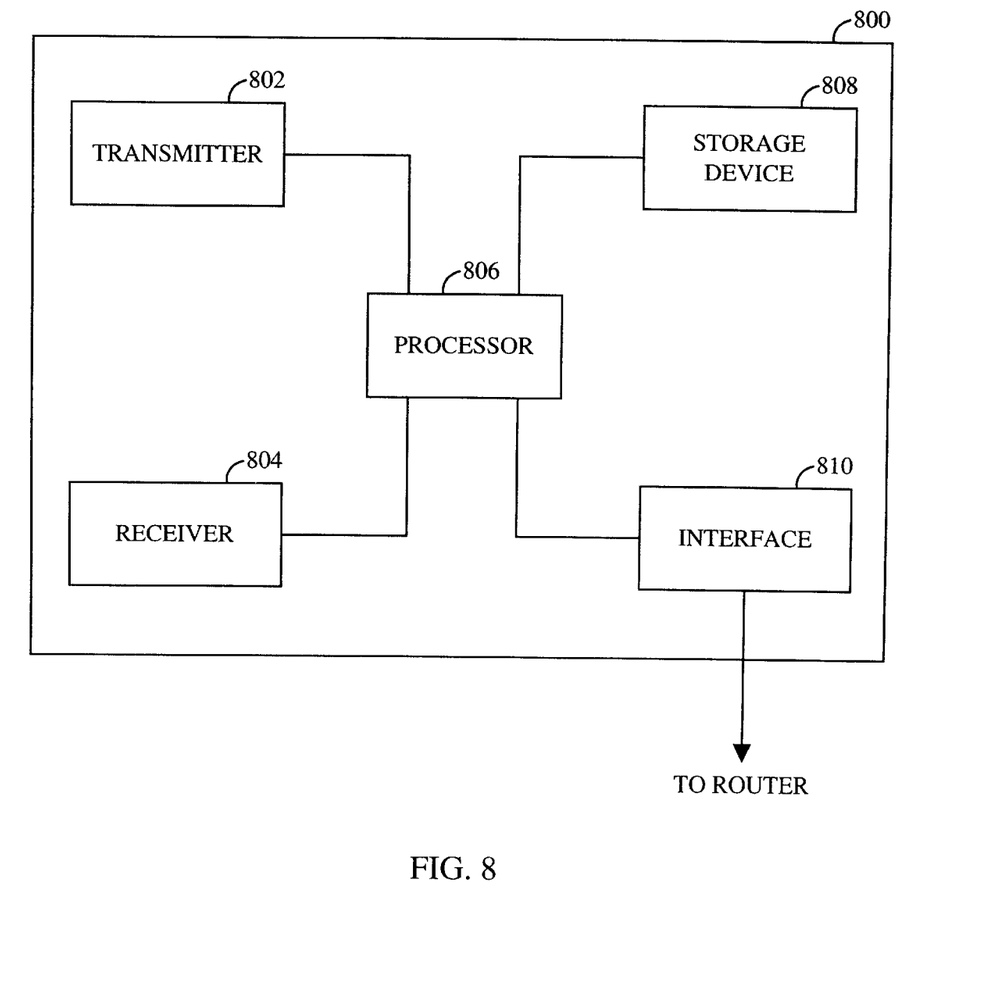
FIG. 8 illustrates the apparatus of the present invention as implemented in the central transceiver of FIG. 5.

FIG. 8 illustrates the apparatus of the present invention as implemented in a central transceiver, shown in functional block diagram format. Shown is central transceiver 800, comprising transmitter 802, receiver 804, processor 806, storage device 808, and interface 810. Central transceiver 800 may comprise a base station, wireless hub, or any other central point of communications for one or more WCDs.

Processor 806 occasionally generates and transmits a membership query to all, or a subset of all, WCDs operating within a coverage area of central transceiver 800. The coverage area may be broken down into geographic coverage areas typically known as "sectors". The membership query may be transmitted to a sector or to the entire coverage area of central transceiver 800.

In response to the membership query, WCDs transmit a membership report to central transceiver 800 as described above. When a membership report is received by central transceiver 800 via receiver 804, it is provided to processor 806. Processor 806 may store an identified multicast group in storage device 808, which comprises random access memory (RAM), a disk drive, a tape drive, or any other means for storing information known in the art. In one embodiment, processor 806 generates an indication of the identified multicast group(s), which is provided to transmitter 802. Transmitter 802 transmits the indication to all, or a subset of all, WCDs operating within the entire coverage area, or one or more sectors, of central transceiver 800. The indication alerts WCDs of which multicast groups are currently in use by at least one WCD so that redundant membership reports can be avoided.

Processor 806 may not generate an indication immediately upon receipt of a single membership report. Instead, processor 806 will wait until a predetermined event occurs. This may include receipt of multiple membership reports or the expiration of a predetermined timer.

In addition to transmitting an indication to WCDs, processor 806 will occasionally provide a second indication of WCD a membership report to an outside entity, such as a Mobile Switching Center, IWF, or a router. The second indication provides information identifying the multicast groups that are currently active by at least one WCD in the coverage area of central transceiver 800. The identification information is then forwarded by the outside entity to data network 118, specifically to other routers so that the multicast information of the identified multicast groups can be provided to central transceiver 800 and ultimately to any WCD desiring the multicast transmission.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An apparatus for providing coverage control for multicast service in a wireless network, said wireless network comprising a central transceiver and a plurality of wireless communication devices, said apparatus comprising:

said central transceiver comprising:
   a receiver for receiving a membership report from a wireless communication device, said membership report identifying a multicast group, said membership report provided to a processor;
   said processor for generating an indication of said multicast group identified in said membership report; and
   a transmitter for transmitting said indication to at least a portion of said plurality of wireless communication devices.

2. The apparatus of claim 1 further comprising:
an interface for providing a second indication to a routing device connected to said central transceiver, said second indication generated by said processor and for identifying at least one multicast group identified in at least one of said membership reports.

3. The apparatus of claim 1 further comprising:
a storage device connected to said processor for storing said membership report;
wherein said processor is further for storing said membership report and for generating said indication based on said membership report stored in said storage device.

4. The apparatus of claim 1 wherein said second indication is provided to said routing device upon the occurrence of a predefined event.

5. The apparatus of claim 4 wherein said predefined event is a expiration of a central transceiver countdown timer.

6. The apparatus of claim 4 wherein said predefined event is a receipt of said membership report.

7. A method for providing coverage control for multicast service in a wireless network, said wireless network comprising a central transceiver and a plurality of wireless communication devices, the method comprising the steps of:

receiving a membership report from a first wireless communication device, said membership report identifying a multicast group;

generating an indication of said received membership report by a processor associated with said central transceiver; and transmitting said indication to at least a portion of said plurality of wireless communication devices, said indication identifying said multicast group identified in said received membership report.

8. The method of claim 7 further comprising the steps of:

generating a membership query by said processor, said membership query for determining said membership report of said portion of said plurality of wireless communication devices; and transmitting said membership query to at least a portion of said plurality of wireless communication devices.

9. The method of claim 8 further comprising the steps of:

generating a second indication by said processor, said second indication identifying at least one multicast group identified in at least one of said membership report; and providing said second indication to a routing device connected to said central transceiver.

10. The method of claim 7 wherein said indication is transmitted to at least one wireless communication device upon the occurrence of a predefined event.

11. The method of claim 10 wherein said predefined event comprises an expiration of a central transceiver countdown timer.

12. The method of claim 10 wherein said predefined event comprises a receipt of said membership report.

13. The method of claim 10 wherein said predefined event comprises a receipt of a predefined number of received membership report.

14. An apparatus for providing coverage control for multicast service in a wireless network, said wireless network comprising a central transceiver and a plurality of wireless communication devices, said apparatus comprising:

a wireless communication device comprising:
a processor for generating a membership report identifying at least one multicast group upon the occurrence of a predefined event;
a receiver for receiving an indication of a membership report transmitted by said central transceiver, said indication identifying at least one multicast group to which a second wireless communication device belongs; and
a transmitter for transmitting said membership report to said central transceiver.

15. The apparatus of claim 14 further comprising:

a storage device for storing information identifying a multicast group to which said wireless communication device currently belongs;

wherein said processor is further for determining whether said multicast group identified in said indication matches said multicast group stored in said storage device.

16. The apparatus of claim 15 wherein said membership report is not transmitted if said multicast group identified in said indication matches said multicast group stored in said storage device.

17. A method for providing coverage control for multicast service in a wireless network, said wireless network comprising a central transceiver and a plurality of wireless communication devices, the method comprising the steps of:

receiving an indication of a membership report transmitted by said central transceiver, said indication identifying a multicast group to which a second wireless communication device belongs;

determining whether said multicast group identified in said indication matches a multicast group to which said wireless communication device currently belongs;

generating a second member report identifying a multicast group to which said wireless communication device currently belongs; and transmitting said second membership report upon the occurrence of a predefined event if said multicast group identified in said indication does not match said multicast group to which said wireless communication device currently belongs.

18. The method of claim 17, wherein said predefined event comprises an expiration of a countdown timer, said countdown timer initiated upon receiving a membership query, said membership query for determining said membership report of said wireless communication device.

19. The method of claim 17, wherein said predefined event comprises an expiration of a countdown timer, said countdown timer associated with a single multicast group to which said wireless communication device currently belongs.

20. The method of claim 17, wherein said predefined event comprises an expiration of a countdown timer, said countdown timer associated with all multicast groups to which said wireless communication device currently belongs.

21. A system for providing coverage control for multicast service in a wireless network, said wireless network comprising a central transceiver and a plurality of wireless communication devices, said system comprising:

said central transmitter for receiving a membership report, said membership report identifying a multicast group that a wireless communication device currently belongs, said central transmitter further for transmitting an indication of said membership report to said plurality of wireless communication devices upon a predetermined event, said indication identifying said received multicast group; and a second wireless communication device for receiving said indication of membership report and for generating a second membership report if said indication does not identify a multicast group that said second wireless communication device currently belongs.

22. The system of claim 21 wherein said second membership report comprises identification of at least one multicast group that said second wireless communication device currently belongs.

23. The system of claim 21 wherein said central transmitter is further for transmitting a second indication of membership report to a router connected to said central transceiver.

24. The system of claim 21 wherein said predetermined event comprises reception of said membership report.

25. The system of claim 21 wherein said predetermined event comprises expiration of a central receiver countdown timer.

26. The system of claim 21 wherein said predetermined event comprises reception of more than one membership report.

* * * * *